United States Patent
Matsuura et al.

(10) Patent No.: US 7,732,027 B2
(45) Date of Patent: Jun. 8, 2010

(54) POLYPROPYLENE FILM AND LAMINATED MATERIAL THEREOF

(75) Inventors: Yoichi Matsuura, Takatsuki (JP); Masanori Takeuchi, Ritto (JP); Kouji Kataoka, Takatsuki (JP); Hiroshi Nozawa, Ichihara (JP)

(73) Assignees: Toray Advanced Film Co., Ltd. (JP); Sumitomo Chemical Company Limited (JP)

( * ) Notice: Subject to any disclaimer, the term of this patent is extended or adjusted under 35 U.S.C. 154(b) by 235 days.

(21) Appl. No.: 11/791,866

(22) PCT Filed: Nov. 28, 2005

(86) PCT No.: PCT/JP2005/021761

§ 371 (c)(1),
(2), (4) Date: May 25, 2007

(87) PCT Pub. No.: WO2006/057378

PCT Pub. Date: Jun. 1, 2006

(65) Prior Publication Data
US 2008/0213519 A1 Sep. 4, 2008

(30) Foreign Application Priority Data
Nov. 29, 2004 (JP) ............... 2004-343559

(51) Int. Cl.
B29D 22/00 (2006.01)
B32B 15/08 (2006.01)
B32B 27/00 (2006.01)
C08L 23/00 (2006.01)
B65D 81/32 (2006.01)
B65D 81/34 (2006.01)
B65D 77/20 (2006.01)

(52) U.S. Cl. ............... 428/35.2; 428/35.3; 428/461; 525/240; 426/112; 426/113; 426/114

(58) Field of Classification Search ............... 428/35.2, 428/35.3, 461; 525/240, 191, 88, 95; 426/112, 426/113, 114
See application file for complete search history.

(56) References Cited

U.S. PATENT DOCUMENTS

| 4,528,234 | A | * | 7/1985 | Kaiho et al. ............... 428/216 |
| 5,888,636 | A | | 3/1999 | Asanuma et al. |
| 5,910,374 | A | | 6/1999 | Shah |
| 6,486,284 | B1 | | 11/2002 | Karande et al. |
| 2002/0187342 | A1 | | 12/2002 | Eggers et al. |
| 2003/0060578 | A1 | * | 3/2003 | Schiffino et al. ............ 526/114 |
| 2003/0220453 | A1 | | 11/2003 | Ebara et al. |
| 2004/0053064 | A1 | * | 3/2004 | Masuda et al. ............ 428/500 |
| 2004/0224117 | A1 | | 11/2004 | Amano |
| 2005/0101738 | A1 | * | 5/2005 | Shimojo et al. ............ 525/240 |

FOREIGN PATENT DOCUMENTS

| EP | 0 185 454 | 6/1986 |
| EP | 0 397 517 | 11/1990 |
| EP | 0 580 377 | 1/1994 |
| EP | 0 588 667 | 3/1994 |
| EP | 0 763 422 | 3/1997 |
| EP | 1 090 947 | 11/2001 |
| EP | 1 207 120 | 5/2002 |
| EP | 1 216 824 | 6/2002 |
| EP | 1 391 295 | 2/2004 |
| JP | 06-228382 | 8/1994 |
| JP | 6228382 | 8/1994 |
| JP | 07-309961 | 11/1995 |
| JP | 7309961 | 11/1995 |
| JP | 11228629 A * | 8/1999 |
| JP | 2000026697 A * | 1/2000 |
| JP | 2000186159 | 7/2000 |
| JP | 2001515114 T | 9/2001 |
| JP | 2003096251 | 4/2003 |
| WO | 99/09096 | 2/1999 |
| WO | 00/73148 | 12/2000 |

OTHER PUBLICATIONS

Machine Translation of JP 2000026697 A.*
Machine Translation of JP 11228629 A.*
Crystallinity, Textbook of Polymer Science, Third Edition; 1984.*
Machine Translation of JP 2000026697 A; Jan. 2000.*
Machine Translation of JP 11228629 A; Aug. 1999.*

* cited by examiner

*Primary Examiner*—Rena L Dye
*Assistant Examiner*—James Yager
(74) *Attorney, Agent, or Firm*—DLA Piper LLP (US)

(57) ABSTRACT

A polypropylene film comprising 70-90 wt. % polymer (a), 2-10 wt. % polymer (b), 2-10 wt. % polymer (c) and 3-20 wt. % polymer (d) and having a haze of 8-30% (wherein the polymer (a) is a block copolymer prepared by producing a polymer part (component a1) by polymerizing in a first step monomers composed mainly of propylene in the absence of an inert solvent and producing an ethylene/propylene copolymer part (component a2) in a second step by polymerization subsequently carried out in a gas phase; the polymer (b) is an ethylene-based polymer having a density of 0.91-0.97 g/cm$^3$ and a melt flow rate of 5-30 g/10 min; the polymer (c) is an ethylene/α-olefin random copolymer having a density of 0.86-0.90 g/cm$^3$ and a melt flow rate of 0.3-5 g/10 min; and the polymer (d) comprises two or more propylene-based polymers different in molecular weight from each other).

8 Claims, No Drawings

POLYPROPYLENE FILM AND LAMINATED MATERIAL THEREOF

RELATED APPLICATION

This is a §371 of International Application No. PCT/JP2005/021761, with an international filing date of Nov. 28, 2005 (WO 2006/057378 A1, published Jun. 1, 2006), which is based on Japanese Patent Application No. 2004-343559, filed Nov. 29, 2004.

TECHNICAL

This disclosure relates to a polypropylene film and a laminated material thereof, and more specifically, to a polypropylene film which is good in transparency and see-through property and is free from a problem of white crease by folding, which is suitable for use in ordinary retort applications as a packaging bag or a sealant for packaging bags, and which has all of low-temperature impact resistance, heat sealability and blocking resistance, and a laminated material thereof.

BACKGROUND

As a conventional sealant film for retort package in which retort sterilization is carried out at a high temperature of 120° C. to 135° C., a non-oriented film (hereinafter, also referred to as "CPP") the main ingredient of which is propylene/ethylene block copolymer has been used. It has been used mainly as a packaging bag after laminating it with an ethylene terephthalate oriented film (hereinafter, also referred to as "PET"), a nylon oriented film (hereinafter, also referred to as "ON") and an aluminum foil (hereinafter, also referred to as "Al foil"), thereby making a laminated material having a structure of PET/ON/Al foil/CPP, PET/Al foil/ON/CPP or PET/Al foil/CPP. In any of these retort bags, in order to preserve foods, which are contained substances, at room temperature for a long term, gas barrier properties (such as oxygen barrier property and water vapor barrier property) and a shading property together with a thermal resistance sufficient enough for bearing a high temperature at the time of sterilization have been required, and therefore, an Al foil has been used.

However, in a retort bag using an Al foil, there are defects that metal foreign matters entrapped into foods cannot be examined after charging the foods, that it cannot be cooked in a microwave oven, and that foods contained in the bag cannot be seen. Recently retort bags free from an Al foil have been desired, and barrier films, such as a film made by depositing silica onto PET or ON or a film made by coating an acrylic barrier agent, have been developed. Properties required for sealant films to be laminated with such metal-free barrier films include a content visibility, concretely, a transparency represented by haze value (a degree of scattering of transmitted light) and a see-through property. It is also important that a phenomenon in which a white trace remains at a portion having been bent or having received an impact (so-called, white crease by folding).

Conventional sealant films for retort package are laminated with opaque Al foil and therefore importance has not been attached to their transparency. They therefore were developed mainly aiming at improvement in low-temperature impact resistance, heat sealability and blocking resistance, etc. There therefore is no sealant film good in transparency and capable of being used satisfactorily as a usual retort packaging bag. For example, JP-A-2000-186159 and JP-A-2003-96251 disclose sealant films for retort food packaging excellent in low-temperature impact resistance, heat sealability and blocking resistance. The films in JP-A-2000-186159, however, have a haze value (: haze) of 45% or more, and the film of Example 1 of JP-A-2003-96251 has a haze value of 53%. Thus, both are poor in transparency. While a film good in transparency having a haze of 20% is disclosed in Comparative Example 2 of JP-A-2003-96251, the blocking resistance of the film is not good, and it cannot be used as a sealant film for retort package.

It could be advantageous to provide a polypropylene film which is good in transparency and see-through property and is free from the problem of white crease by folding, and which is suitable for use in ordinary retort applications as a packaging bag or a sealant for packaging bags, and has all of low-temperature impact resistance, heat sealability and blocking resistance, and a laminated material thereof.

SUMMARY

We provide films prepared kneading polymers with specified compositions. Namely, a polypropylene film is a film which comprises 70-90 wt. % polymer (a), 2-10 wt. % polymer (b), 2-10 wt. % polymer (c) and 3-20 wt. % polymer (d) (where, the total weight of the polymers is 100 wt. %) and has a haze of 8-30%:

polymer (a): a propylene/ethylene block copolymer which is a block copolymer prepared by producing in a first step a polymer part (component a1) by polymerizing monomers composed mainly of propylene in the absence of an inert solvent and subsequently producing in a second step an ethylene/propylene copolymer part (component a2) through polymerization in a gas phase, wherein the content of component a2 is 15-25 wt. % where the combined amount of component a1 and component a2 is 100 wt. %, and a ratio of the intrinsic viscosity of component a2 ($[\eta]$a2) to the intrinsic viscosity of component a1 ($[\eta]$a1), $[\eta]$a2/$[\eta]$a1, is 0.8-1.5;

polymer (b): an ethylene-based polymer having a density of 0.91-0.97 g/cm$^3$ and a melt flow rate of 5-30 g/10 min;

polymer (c): an ethylene/a-olefin random copolymer having a density of 0.86-0.90 g/cm$^3$ and a melt flow rate of 0.3-5 g/10 min;

polymer (d): a propylene-based polymer which comprises two or more propylene-based polymers different in molecular weight from each other, wherein the intrinsic viscosity ($[\eta]$d1) of a component having a highest molecular weight (component d1) is not less than 5 dl/g but less than 10 dl/g and is at least twice the intrinsic viscosity ($[\eta]$d) of the whole of polymer (d).

We also provide laminated materials containing the above-described polypropylene film, namely, a laminated material wherein the above-described polypropylene film is laminated on one surface of a substrate layer comprising a transparent film composed of a single layer or two or more layers, and a laminated material wherein the above-described polypropylene film is laminated on one surface of a substrate layer comprising a transparent film composed of a single layer or two or more layers and an aluminum foil laminated together.

We also provide a packaged material wherein a substance to be packaged is packaged by heat sealing such a laminated material. One example of the substance to be packaged is a retort food.

The polypropylene film is good in transparency and see-through property and is free from the problem of white crease by folding, and it has all of low-temperature impact resistance, heat sealability and blocking resistance, and it can be used suitably as a sealant film for ordinary retort packaging bags. Further, such a film may be laminated. Therefore, by producing a bag by using this laminated material while employing the layer of the polypropylene film as a sealant layer, an excellent packaging bag for retort, excellent in transparency and see-through property and free from the problem of white crease by folding, can be provided.

DETAILED DESCRIPTION

Hereinafter, the polypropylene film and the laminated material containing the film will be explained concretely.

The polypropylene film must comprise a composition containing 70-90 wt. % of polymer (a), 2-10 wt. % of polymer (b), 2-10 wt. % of polymer (c) and 3-20 wt. % of polymer (d), where the total content of the four polymers is 100 wt. %. If the content of polymer (a) is less than 70 wt. %, the film is poor in low-temperature impact resistance, and if more than 90 wt. %, the transparency deteriorates. If the content of polymer (b) is less than 2 wt. %, the film is poor in transparency, and if more than 10 wt. %, the low-temperature impact resistance deteriorates. If the content of polymer (c) is less than 2 wt. %, the film is poor in low-temperature impact resistance, and if more than 10 wt. %, the blocking resistance deteriorates. If the content of polymer (d) is less than 3 wt. %, the advantage for improving the see-through property of the film cannot be exhibited, and if more than 20 wt. %, the low-temperature impact resistance deteriorates.

Polymer (a) is a propylene/ethylene block copolymer which is a block copolymer prepared by producing in a first step a polymer part (component a1) by polymerizing monomers composed mainly of propylene in the absence of an inert solvent and subsequently producing in a second step an ethylene/propylene copolymer part (component a2) through polymerization in a gas phase, wherein the content of component a2 is 15-25 wt. % where the combined amount of component a1 and component a2 is 100 wt. %, and a ratio of the intrinsic viscosity of component a2 ($[\eta]a2$) to the intrinsic viscosity of component a1 ($[\eta]a1$), $[\eta]a2/[\eta]a1$, is 0.8-1.5. Polymer (b) is an ethylene-based polymer having a density of 0.91-0.97 g/cm$^3$ and a melt flow rate of 5-30 g/10 min. Polymer (c) is an ethylene/α-olefin random copolymer having a density of 0.860-0.900 g/cm$^3$ and a melt flow rate of 0.3-5 g/10 min. Polymer (d) comprises two or more propylene-based polymers different in molecular weight from each other, wherein the intrinsic viscosity ($[\eta]d1$) of a component having a highest molecular weight (component d1) is not less than 5 dl/g but less than 10 dl/g and is at least twice the intrinsic viscosity ($[\eta]d$) of the whole of polymer (d).

The polymer (a) is a block copolymer prepared by producing in a first step a polymer part (component a1) by polymerizing monomers composed mainly of propylene in the absence of an inert solvent and subsequently producing in a second step an ethylene/propylene copolymer part (component a2) through polymerization in a gas phase. The content of propylene in the monomers used in the above-described first step is preferably 98-100 wt. %. For the polymerization for preparing the polymer (a), a Ziegler-Natta catalyst or metallocene catalyst may be employed as a catalyst, and for example, one disclosed in JP-A-07-216017 can be preferably used. One specific example is a catalyst system comprising (1) a trivalent titanium compound-containing solid catalyst prepared by treating with an ester compound, a solid product resulting from reduction of a titanium compound represented by a formula Ti(OR3)$_a$X$_{4-a}$ (in the formula, R3 is a hydrocarbon group with a carbon number of 1-20, X is a halogen atom, "a" represents a number satisfying $0<a\leq 4$, preferably, $2\leq a\leq 4$, most preferably, a=4) by use of an organomagnesium compound in the presence of an organosilicon compound having a Si—O bond and an ester compound, and thereafter treating the solid product with a mixture of an ether compound and titanium tetrachloride or a mixture of an ether compound, titanium tetrachloride and an ester compound, (2) an organoaluminum compound, and (3) an electron donative compound (dialkyldimethoxysilane and the like are preferably used). When polymerization was carried out using an inert solvent such as hexane, heptane, benzene, toluene and xylene as a medium, the resulting film may be poor in low-temperature impact resistance. Specific examples of the first step include polymerization using liquid propylene as a medium and polymerization carried out in gaseous propylene. It is exceptionally possible to use a very small amount of inert solvent only for the purpose of introducing a catalyst into a polymerization vessel during the polymerization.

As the component a1 of the polymer (a), a propylene homopolymer prepared by polymerization of only propylene is preferred, and a propylene homopolymer having a melting point of 160° C. or more is preferred from the viewpoint of thermal resistance. If the melting point is 155° C. or more, a small amount of ethylene, butene-1 etc. may be copolymerized. The content of ethylene contained in the ethylene/propylene copolymer part (component a2) of the polymer (a) is preferably 15-60 wt. % from the viewpoint of transparency and low-temperature impact resistance, where the sum of the contents of propylene and ethylene contained in the ethylene/propylene copolymer part (component a2) is 100 wt. %.

In the polymer (a), the content of component a2 is 15-25 wt. %, where the sum of component a1 and component a2 is 100 wt. %. If the content of component a2 is less than 15 wt. %, the low-temperature impact resistance may be poor, and if more than 25 wt. %, the blocking resistance may be poor. The method for adjusting the content of component a2 may be a method comprising controlling the polymerization temperature, the residence time, etc. in each step of the polymerization.

The ratio of the intrinsic viscosity of component a2 ($[\eta]a2$) to the intrinsic viscosity of component a1 ($[\eta]a1$) ($[\eta]a2/[\eta]a1$) must be 0.8-1.5, and in particular, preferably 0.8-1.2. If $[\eta]a2/[\eta]a1$ is less than 0.8, the blocking resistance may be poor, and if more than 1.5, the transparency deteriorates.

The melt flow rate (MFR, unit: g/10 min) of polymer (a) at 230° C. and a load of 21.18 N is preferably 1.0-3.5, particularly, preferably 1.5-2.5, from the viewpoint of transparency, flow stability at the time of film forming and low-temperature impact resistance.

The method for adjusting the intrinsic viscosities of components a1 and a2 of polymer (a) and the melt flow rates may be a method comprising adding a molecular weight regulator such as hydrogen gas and a metal compound in each step of the polymerization, a method comprising adding an additive when a polymer prepared in a form of powder is molten and kneaded, a method comprising adjusting the kneading condition when a polymer prepared in a form of powder is molten and kneaded, etc.

Polymer (b) is an ethylene-based polymer, that is, a polymer made up mainly of ethylene, having a density of 0.91-0.97 g/cm$^3$ and a melt flow rate at 190° C. and a load of 21.18 N of 5-30 g/10 min, and preferably it is an ethylene homopolymer or a copolymer of ethylene and α-olefin having a carbon number of 3 or more (for example, propylene, 1-butene, 1-pentene, 1-hexene or 1-octene) having a density of 0.91-0.97 g/cm$^3$, preferably 0.93-0.97 g/cm$^3$. A commercially available product produced by a conventionally known process may be used. In the case of a copolymer, units originating from ethylene account for 95 wt. % or more. If the density of polymer (b) is less than 0.91 g/cm$^3$, the blocking resistance may deteriorate, and if more than 0.97 g/cm$^3$, the impact resistance may deteriorate. If the melt flow rate (MFR) of polymer (b) at 190° C. and a load of 21.18 N is less than 5 g/10 min, the see-through property may deteriorate. On the other hand, if the MFR is more than 30 g/10 min, the low-temperature impact resistance may be poor. The MFR of polymer (b) is preferably 7-20 g/10 min.

Polymer (c) must be an ethylene/α-olefin random copolymer having a density of 0.86-0.90 g/cm$^3$ and a melt flow rate at 190° C. and a load of 21.18 N of 0.3-5 g/10 min, and it is preferably a copolymer of ethylene and α-olefin having a carbon number of 3 or more (for example, propylene, 1-butene or 1-pentene). If the density is less than 0.86 g/cm$^3$, the blocking resistance deteriorates, and if the density is more than 0.90 g/cm$^3$, the low-temperature impact resistance deteriorates. If the MFR of polymer (c) at 190° and a load of 21.18 N is less than 0.3 g/10 min, the miscibility with other polymers may deteriorate, and if more than 5 g/10 min, the blocking resistance may deteriorate. Concretely, it is preferable to use, as polymer (c), a copolymer selected from the group consisting of ethylene/propylene random copolymers, ethylene/butene random copolymers and ethylene/propylene/butene random terpolymers.

Polymer (d) is a propylene-based polymer comprising two or more propylene-based polymers different in molecular weight from each other, wherein the intrinsic viscosity ([η]d1) of component having the highest molecular weight (component d1) is not less than 5 dl/g but less than 10 dl/g, and is at least twice the intrinsic viscosity ([η]d) of the whole of polymer (d). Kneading this polymer (d) with the above-described polymers (a), (b) and (c) and making a film therefrom make it possible to attain uniform kneading and stable extrusion of molten film, and the transparency and the see-through property of the film become good. The intrinsic viscosity ([η]d1) of component d1, which is the component having the highest molecular weight among the components of polymer (d), must be not less than 5 dl/g but less than 10 dl/g. If it is less than 5 dl/g, improvement in the see-through property is insufficient, and if more than 10 dl/g, foreign matters may adversely be generated in a film. If the intrinsic viscosity ([η]d1) of component d1 is less than twice the intrinsic viscosity ([η]d) of the whole of polymer (d), the kneading property deteriorates and the transparency and the see-through property of the film deteriorate. The content of component d1 of polymer (d) is preferably 3-25 wt. %, where the whole of polymer (d) is 100 wt. %.

The melt flow rate (MFR, unit: g/10 min) of polymer (d) at 230° C. and a load of 21.18 N is preferably 10-20 from the viewpoint of improving the miscibility with other polymers and the low-temperature impact resistance.

Polymer (d) is a polymer prepared by polymerizing monomers mainly comprising propylene. Component d1 and component d2 each may be, for example, a propylene homopolymer, a random copolymer of propylene and up to 5 wt. % of ethylene, a random copolymer of propylene and up to 10 wt. % of butene or a random terpolymer of propylene, up to 5 wt. % of ethylene and up to 10 wt. % of butene.

As the process for preparing polymer (d), for example, a process disclosed in JP-A-11-228629 may be employed, and as the method for adjusting the intrinsic viscosity ([η]d1) of component d1 and the intrinsic viscosity ([η]d) and the melt flow rate of the whole of polymer (d), a method comprising adding a molecular weight regulator such as hydrogen gas and a metal compound at each step of the polymerization may be employed.

The haze of the film must be 8-30%. A haze less than 8% is undesirable because, an inconvenience such as poor appearance due to excessive gloss occurs. If the haze is more than 30%, the transparency of the film as a packaging bag becomes poor. If the contents of polymer (b) and polymer (c) among the polymers forming the film increase, the haze of the film can be decreased, but the see-through property of the film tends to deteriorate. On the other hand, the see-through property of the film tends to be improved by increasing the content of polymer (d). In consideration of these tendencies, the compounding ratio of polymers (a), (b), (c) and (d) may be decided in accordance with a target haze. The haze can be decreased by raising the temperature for film forming or by lowering the temperature for cooling the film. If, however, the film-forming temperature is too high or the film cooling temperature is too low, the blocking resistance of the film tends to deteriorate.

The center line average roughness (Ra) of the film is preferably 0.08-0.16 μm, particularly 0.12-0.16 μm, from the viewpoint of blocking resistance and transparency. The center line average roughness of the film tends to increase if the value of [η]a2/[η]a1 of polymer (a) is increased, and it tends to increase if the film-forming temperature is lowered.

The film is obtained by mixing the above-described polymers (a), (b), (c) and (d) by a usual method and shaping the resulting mixture, into a form of film by a usual process. For example, it may be produced by melting and kneading required amounts of pellets or powders of the above-described polymers (a), (b), (c) and (d) with a single or twin screw extruder, then filtrating the kneaded material through a filter followed by extrusion through a flat die (for example, a T-die) or an annular die into a form of film. A temperature of 200-300° C. is employed usually as the temperature of the molten polymer extruded from the extruder in order to prevent decomposition of the polymer and obtain a good-quality film. It, however, is preferred to employ a temperature of 220-270° C. In a case of extrusion through a T-die, the extruded film is brought into contact with cooling rolls set at a constant temperature of 20-65° C., and after cooling and solidifying the film, the film is wound. In a case of extrusion through an annular die, a bubble is produced by a process generally called a tubular film process, and it is then cooled to solidify, slit, and thereafter wound. Although the film may be drawn after the solidification by cooling, it is preferably a non-oriented film which has experienced substantially no orientation. The thickness of the film is preferably 20-300 μm, more preferably 40-100 μm.

The film can be used solely as a film for package, and in particular, it is suitable for use as a transparent bag for retort food packaging, for which transparency and resistance to white crease by folding are required. In a case of being used in an application where a transparency is not required, it can be used also as a sealant film for retort food packaging bags containing an aluminum foil layer. In this case, inhibition of occurrence of so-called "orange peel" is recognized as a secondary advantage. The "orange peel" means a defective phenomenon where an irregularity is formed on a film surface after an oily food such as curry is enclosed and then subjected to retort sterilization.

The film can contain an antioxidant, a thermal stabilizer, an antistatic agent, a hydrochloric acid absorbent, an antiblocking agent, a lubricant, a nucleating agent, etc.

The film may be subjected to surface treatment usually carried out industrially, such as corona discharge treatment, plasma treatment or ozone treatment in the atmosphere or in a nitrogen or carbon dioxide atmosphere.

The laminated material is a laminated material in which the above-described film (hereinafter, referred to as "the invented film") is laminated on one surface of a substrate layer comprising a transparent film with a single layer or with two or more layers. For example, PET/the invented film, ON/the invented film, silica deposited PET/the invented film, alumina deposited PET/the invented film, silica/alumina dual deposited PET/the invented film, silica deposited ON/the invented film, alumina deposited ON/the invented film, acrylic resin coated barrier PET/ON/the invented film, PET/EVOH/the invented film, PET/transparent deposited ON/the invented film, etc. can be provided as preferred embodiments. In the embodiments, "EVOH" means an ethylene/vinyl alcohol copolymer film. In particular, a laminated material in which the invented film is laminated on one surface of a substrate layer comprising a transparent film composed of a single layer or two or more layers and an aluminum foil laminated together is useful as a material for retort food packaging bags.

As the process for producing the laminated material, a usual dry lamination process comprising laminating films forming the laminated material by using an adhesive is appropriately employed. An extrusion lamination process comprising simultaneously performing forming of the invented film by extrusion and lamination of the extruded film and the substrate layer may also be employed.

Such a laminated material may be fabricated into a product form of a packaging bag such as a flat bag and a standing pouch by using the invented film as an inner sealant layer.

The lamination structure of the laminated material may be appropriately decided in accordance with its use. For example, the lamination structure of the laminated material used as a material for a package bag is appropriately decided in accordance with properties required for the bag (for example, barrier properties for satisfying the quality assurance term of a substance to be packaged, a size and an impact resistance enough for bearing the weight of the substance, and the visibility of the substance).

The explanation of our films and the determination of items to be determined in Examples were carried out as follows.

(1) Contents of Components a1 and a2:

Unless specially described, the contents of components a1 and a2 in a propylene/ethylene block copolymer were determined from the mass balance in the polymerization.

(2) Intrinsic Viscosity:

The intrinsic viscosities of polymers and compositions were determined in Tetralin at 135□ by using an Ubbelohde viscometer.

(3) Ethylene Content:

The content of ethylene in a polymer was determined by infrared spectroscopic analysis described in "Polymer Handbook" (1995, published by Kinokuniya Company Ltd.), from page 616. The content of ethylene contained in component a2 of polymer (a) was calculated from the following equation.

(content of ethylene contained in component $a2$)=
(content of ethylene contained in polymer ($a$))×
100/(content of component $a2$ in polymer ($a$))

(4) Melt Flow Rate (MFR):

Based on JIS K-7210, the MFRs of a propylene/ethylene block copolymer and a propylene-based polymer were determined at a temperature of 230° C. and a load of 21.18 N, and the MFRs of an ethylene-based polymer and an ethylene/α-olefin random copolymer were determined at a temperature of 190□ and a load of 21.18 N.

(5) Haze:

The haze of a film was determined based on JIS K-7136.

(6) Density:

The density of a polymer was determined by a method using a density gradient tube based on JIS K-7112.

(7) Surface Roughness:

The center line average roughness (Ra) of a film surface was determined by the method defined in JIS B-0601 (1982). The direction of the determination was a direction perpendicular to the flow direction of the film.

(8) Low-temperature Impact Resistance:

A iron ball of 0.5351 kg was dropped onto a sample kept at 0° C. from a height of 2 m to break and penetrate the sample. The low-temperature impact resistance (impact energy resistance) was determined from the following equation, based on a difference between a dropping velocity of the iron ball when the iron ball broke and penetrated the sample and a dropping velocity of the iron ball in a case where no sample was present.

$$E=(1/2)\cdot M\cdot L^2(1/t_0^2-1/t_1^2)$$

E: low-temperature impact resistance (J)

M: mass of iron ball (0.5351 kg)

L: distance between two photoelectric tubes (0.1 m)

$t_0$: passage time of iron ball in a case where no film was present (s)

$t_1$: passage time of iron ball when the iron ball broke and penetrated the sample(s)

(9) Blocking Resistance:

Film samples each having a width of 30 mm and a length of 100 mm were prepared and the sealing surfaces thereof were overlapped to each other in a region of 30 mm×40 mm. Under a load of 500 g/12 cm², the film samples were heat treated in an oven at 60° for 24 hours, and then they were left at rest in an atmosphere of 23° and a humidity of 65% for 30 min or more. Thereafter, using a "Tensilon" (a tensile tester) produced by Orientec Co., Ltd., a shear delamination force was determined at a tensile speed of 300 mm/min. In this determination, when the shear delamination force was 1.5 kgf/12 cm² or less, the blocking resistance of the film was judged to be good.

(10) See-through Property:

The see-through property of a film was determined by setting the film 10 cm apart from a surface of a newspaper, and visually observing the characters of an article through the film. A condition where the characters of the article could be read extremely clearly was determined as Rank 1, a condition where the characters could be read clearly was determined as Rank 2, a condition where the characters slightly faded but could be read was determined as Rank 3, a condition where the characters faded and could not be accurately read was determined as Rank 4, and a condition where the characters faded and could not be read at all was determined as Rank 5. In this determination, Ranks 1 and 2 were determined to be good in see-through property.

(11) Resistance to White Crease by Folding:

Using an MIT type folding endurance tester produced by Toyo Seiki Seisaku-Sho, Ltd.), the state of white crease by folding of a folded part of a sample after 100 foldings at a sample width of 10 mm, a folding angle of 135 degrees (left and right) and a load of 514 kg was determined through visual observation. A condition where there was no white crease was determined as Rank 1, a condition where there was very slight white crease was determined as Rank 2, a condition where there was slight white crease was determined as Rank 3, a condition where there was clear white crease was determined as Rank 4, and a condition where the folded part became a clear white crease was determined as Rank 5. In this determination, Ranks 1 and 2 were determined to be good in resistance to white crease by folding.

(12) Heat Sealability:

A sample prepared by heat sealing at a sealing temperature of 180° C., a sealing pressure of 1 kgf/cm$^2$ and a sealing time of 1 second using a flat heat sealer was delaminated at a tensile speed of 300 mm/min using a "Tensilon" produced by Orientec Co., Ltd. If the sealing strength is 4.5 kgf/15 mm or more in this determination, it can be used well for ordinary retort applications.

EXAMPLES

Hereinafter, the films will be explained concretely based on Examples, but the scope of the films is not limited thereto.

Example 1

The following polymers (a), (b), (c) and (d) were used.

(1) Polymer (a):

A polymer was prepared by producing in a first step a propylene homopolymer part having an intrinsic viscosity of 2.8 dl/g in a gas phase using a Ziegler-Natta catalyst and producing in a subsequent second step an ethylene/propylene copolymer part having an intrinsic viscosity of 2.8 dl/g and an ethylene content of 36 wt. % in a gas phase. To 100 parts by weight of the polymer, 0.05 parts by weight of calcium stearate and 0.05 parts by weight of vitamin E were mixed and melt-kneaded to yield pellets of a propylene/ethylene block copolymer having an MFR of 2.0 g/10 min at 230° C. and a load of 21.18 N. The content of ethylene/propylene copolymer part (component a2) was 21 wt. %.

(2) Polymer (b):

As polymer (b), commercially available high-density ethylene pellets having a density of 0.950 g/cm$^3$ and an MFR at 190° C. and a load of 21.18 N of 16.0 g/10 min were used.

(3) Polymer (c):

As polymer (c), ethylene/butene-1 random copolymer pellets ("TAFMER" A4085, produced by Mitsui Chemicals, Inc.) having a density of 0.88 g/cm$^3$ and an MFR at 190° C. and a load of 21.18 N of 3.6 g/10 min were used.

(4) Polymer (d):

A propylene homopolymer comprising 9 wt. % of component d1 with an intrinsic viscosity of 7.6 dl/g and 91 wt. % of a component with an intrinsic viscosity of 1.2 dl/g and having as a whole an intrinsic viscosity of 1.8 dl/g was prepared by a process comprising production of a first component by polymerizing propylene in a first step using the polymerization catalyst disclosed in Example 1 of JP-A-11-228629 and based on the polymerization process and the polymerization conditions disclosed in the Example, transfer of the catalyst and the first component to a second step without deactivation of the catalyst, and production of a component different in molecular weight from the first component by polymerizing propylene in the second step. To 100 parts by weight of this polymer, 0.2 parts by weight of an antioxidant "IRGANOX" 1010 (:product name, produced by Ciba Specialty Chemicals Corporation), 0.25 parts by weight of an antioxidant "IRGAFOS" 168 (:product name, produced by Ciba Specialty Chemicals Corporation) and 0.05 parts by weight of calcium stearate were mixed, and then melt-kneaded in a twin-screw extruder TEM75 (:product name, produced by Toshiba Machine Co., Ltd.) at 200° C., a discharge amount of 300 kg/hour and a screw rotation speed of 250 rpm. Thus, pellets were obtained, which had an MFR 230° C. and a load of 21.18 N of 14 g/10 min.

80 wt. % of the above-described polymer (a), 5 wt. % of the polymer (b), 5 wt. % of the polymer (c) and 10 wt. % of the polymer (d) were blended with a blender and supplied to an extruder. The blend was melt-kneaded and filtrated through a filter, and then was extruded through a T-die at 250° C. and an extrusion speed of 60 m/min. Thereafter, the extrudate was brought into contact with a cooling roll at 45° C., thereby being cooled and solidified. A film having a thickness of 70 μm was obtained after corona discharge treatment on one surface thereof. The haze of the resulting film was 16%, and the film was good in see-through property and excellent in resistance to white crease by folding. The film also had sufficient low-temperature impact resistance, heat sealability and blocking resistance for ordinary retort applications.

Examples 2-4

Films having a thickness of 70 μm were prepared in the same manner as that of Example 1 except conditions where the compounding ratio of polymers (a), (b), (c) and (d) used in Example 1 was changed as shown in Table 1. The results of the quality determinations of these films are shown in Table 2. All the films were good in see-through property and excellent in resistance to white crease by folding, and the films also had sufficient low-temperature impact resistance, heat sealability and blocking resistance for ordinary retort applications.

Comparative Examples 1-7

Films having a thickness of 70 μm were prepared in the same manner as that of Example 1 except conditions where the compounding ratio of polymers (a), (b), (c) and (d) used in Example 1 was changed as shown in Table 1. The results of the quality determinations of these films are shown in Table 2. In the film of Comparative Example 1 comprising a single polymer, polymer (a), the haze, the see-through property and the resistance to white crease by folding were all not good. The film of Comparative Example 2, which contains no polymer (b), was poor in see-through property and resistance to white crease by folding. The film of Comparative Example 3, which contains no polymer (c), was poor in low-temperature impact resistance. The film of Comparative Example 4, which contains no polymer (d), was poor in see-through property and resistance to white crease by folding. The film of Comparative Example 5, which contains polymer (c) at a content more than our range, was good in low-temperature impact resistance but it could not be used for retort applications because of its poor see-through property and poor blocking resistance. The film of Comparative Example 6, which contains polymer (b) at a content more than our range, was poor in low-temperature impact resistance and heat sealability. The film of Comparative Example 7, which contains polymer (a) at a content less than our range and polymer (d) at a content more than our range, could not be used for retort applications because of its remarkably poor low-temperature impact resistance.

Comparative Example 8

A propylene/ethylene block copolymer having an MFR of 3.0 g/10 min determined at of 230° C. and a load of 21.18 N was prepared by producing a propylene homopolymer part having an intrinsic viscosity of 1.8 dl/g in a gas phase in a first step using a Ziegler-Natta catalyst, subsequently producing an ethylene/propylene copolymer part having an intrinsic viscosity of 3.5 dl/g and an ethylene content of 30 wt. % by gas phase polymerization in a second step, and mixing 0.005 parts by weight of calcium hydroxide and 0.2 parts by weight of an antioxidant "IRGANOX" 1010 (:product name, produced by Ciba Specialty Chemicals Corporation) to 100 parts by weight of this polymer and thereafter melt-kneading it. The content of ethylene/propylene copolymer part (component a2) was 22 wt. %.

In the same manner as that of Example 1 except a condition where the resulting polymer was used instead of polymer (a) of Example 1, a film having a thickness of 70 μm was prepared. The result of determination of the obtained film is as shown in Table 2. The haze was high as much as 33%, and the resistance to white crease by folding was Rank 4. They therefore did not satisfy our purpose.

Example 5

An ethylene terephthalate oriented film deposited with silica and having a thickness of 12 μm (silica deposited PET), a nylon-6 oriented film having a thickness of 15 μm (ON) and the film of Example 1 were laminated using a urethane-based adhesive by a usual dry lamination process to yield a laminated material having a thickness of 102 μm and the following structure.

Structure of Laminated Material:

Silica Deposited PET/Adhesive/ON/Adhesive/Film of Example 1

This laminated material had good transparency and see-through property. Two sheets of this laminated material were heat sealed using a flat heat sealer at a sealing temperature of 180° C., a sealing pressure of 1 kgf/cm² and a sealing time of 1 second so that the films of Example 1 formed inner surfaces of a bag. Thus, a three-side sealed bag (flat bag, sealing width: 5 mm) having a size (inner size) of 160 mm×210 mm was produced. After 500 g of brine was charged into this bag, it was retort treated at 125° C. for 30 min. After the bag retort treated was preserved in a refrigerator at 0° for 24 hours, it was dropped five times onto a flat floor from a height of 150 cm, but it did not break, and therefore it was confirmed that it had a low-temperature impact resistance enough for practical use. The strength of the sealed part after the retort treatment was 5.8 kgf/15 mm, which was enough for practical use. When 450 g of Japanese hotchpotch was contained in this three-side sealed bag, the contained substance could be clearly observed and therefore it was good as a transparent retort bag.

Example 6

An ethylene terephthalate oriented film having a thickness of 12 μm, a nylon-6 oriented film having a thickness of 15 μm (ON), an aluminum foil having a thickness of 9 μm and the film of Example 1 were laminated using a urethane-based adhesive by a usual dry lamination process. Thus, a laminated material having a thickness of 115 μm and the following structure was obtained.

Structure of Laminated Material:

PET/Adhesive/ON/Adhesive/Aluminum Foil/Adhesive/Film of Example 1

Two sheets of this laminated material were heat sealed using a flat heat sealer at a sealing temperature of 180° C., a sealing pressure of 1 kgf/cm² and a sealing time of 1 second so that the films of Example 1 formed inner surfaces of a bag. Thus, a three-side sealed bag (flat bag, sealing width: 5 mm) having a size (inner size) of 160 mm×210 mm was obtained. After a commercially available retort curry (retort curry "Kukure Curry", produced by House Foods Corporation) was charged into this bag, it was retort treated at 125° C. for 30 min. After the bag retort treated was preserved in a refrigerator at 0° C. for 24 hours, it was dropped five times onto a flat floor from a height of 150 cm, but it did not break, and therefore it was confirmed that it had a low-temperature impact resistance enough for practical use. The strength of the sealed part after the retort treatment was 6.1 kgf/15 mm, which was enough for practical use. Almost occurrence of so-called "orange peel" immediately after the retort treatment was recognized, and it was clearly superior in appearance to the laminated material using the film prepared in Comparative Example 1.

TABLE 1

| | Polymer (a) | | | | | | Polymer (b) | | |
| --- | --- | --- | --- | --- | --- | --- | --- | --- | --- |
| | Content of component (a2) wt. % | $[\eta]a1$ dl/g | $[\eta]a2$ dl/g | $[\eta]a2/[\eta]a1$ | MFR g/10 min | Compounding ratio wt. % | Density g/cm³ | MFR g/10 min | Compounding ratio wt. % |
| Example 1 | 21 | 2.8 | 2.8 | 1.00 | 2 | 80 | 0.95 | 16 | 5 |
| Example 2 | 21 | 2.8 | 2.8 | 1.00 | 2 | 89 | 0.95 | 16 | 3 |
| Example 3 | 21 | 2.8 | 2.8 | 1.00 | 2 | 70 | 0.95 | 16 | 8 |
| Example 4 | 21 | 2.8 | 2.8 | 1.00 | 2 | 72 | 0.95 | 16 | 3 |
| Comparative Example 1 | 21 | 2.8 | 2.8 | 1.00 | 2 | 100 | 0.95 | 16 | 0 |
| Comparative Example 2 | 21 | 2.8 | 2.8 | 1.00 | 2 | 85 | 0.95 | 16 | 0 |
| Comparative Example 3 | 21 | 2.8 | 2.8 | 1.00 | 2 | 85 | 0.95 | 16 | 5 |
| Comparative Example 4 | 21 | 2.8 | 2.8 | 1.00 | 2 | 90 | 0.95 | 16 | 5 |
| Comparative Example 5 | 21 | 2.8 | 2.8 | 1.00 | 2 | 75 | 0.95 | 16 | 5 |
| Comparative Example 6 | 21 | 2.8 | 2.8 | 1.00 | 2 | 75 | 0.95 | 16 | 15 |
| Comparative Example 7 | 21 | 2.8 | 2.8 | 1.00 | 2 | 65 | 0.95 | 16 | 5 |
| Comparative Example 8 | 22 | 1.8 | 3.5 | 1.94 | 3 | 80 | 0.95 | 16 | 5 |

TABLE 1-continued

|  | Polymer (c) | | | Polymer (d) | | | | |
| --- | --- | --- | --- | --- | --- | --- | --- | --- |
|  | Density g/cm³ | MFR g/10 min | Compounding ratio wt. % | [η]d1 dl/g | [η]d dl/g | [η]d1/ [η]d | MFR g/10 min | Compounding ratio wt. % |
| Example 1 | 0.88 | 3.6 | 5 | 7.6 | 1.8 | 4.2 | 14 | 10 |
| Example 2 | 0.88 | 3.6 | 3 | 7.6 | 1.8 | 4.2 | 14 | 5 |
| Example 3 | 0.88 | 3.6 | 10 | 7.6 | 1.8 | 4.2 | 14 | 12 |
| Example 4 | 0.88 | 3.6 | 5 | 7.6 | 1.8 | 4.2 | 14 | 20 |
| Comparative Example 1 | 0.88 | 3.6 | 0 | 7.6 | 1.8 | 4.2 | 14 | 0 |
| Comparative Example 2 | 0.88 | 3.6 | 5 | 7.6 | 1.8 | 4.2 | 14 | 10 |
| Comparative Example 3 | 0.88 | 3.6 | 0 | 7.6 | 1.8 | 4.2 | 14 | 10 |
| Comparative Example 4 | 0.88 | 3.6 | 5 | 7.6 | 1.8 | 4.2 | 14 | 0 |
| Comparative Example 5 | 0.88 | 3.6 | 15 | 7.6 | 1.8 | 4.2 | 14 | 5 |
| Comparative Example 6 | 0.88 | 3.6 | 5 | 7.6 | 1.8 | 4.2 | 14 | 5 |
| Comparative Example 7 | 0.88 | 3.6 | 5 | 7.6 | 1.8 | 4.2 | 14 | 25 |
| Comparative Example 8 | 0.88 | 3.6 | 5 | 7.6 | 1.8 | 4.2 | 14 | 10 |

[Table 2]

TABLE 2

|  | Film properties | | | | | | | |
| --- | --- | --- | --- | --- | --- | --- | --- | --- |
|  | Haze % | See-through property rank | Surface roughness μm | Thickness of stripe part μm | Resistance to white crease by folding rank | Low-temperature impact resistance J | Heat sealability (sealing strength) kgf/15 mm | Blocking resistance kgf/ 12 cm² |
| Example 1 | 16 | 1 | 0.13 | 0.05 | 1 | 2.9 | 6.3 | 1.1 |
| Example 2 | 28 | 2 | 0.14 | 0.15 | 2 | 3.0 | 7.0 | 1.0 |
| Example 3 | 12 | 2 | 0.12 | 0.05 | 1 | 3.5 | 5.6 | 1.4 |
| Example 4 | 10 | 2 | 0.13 | 0.05 | 1 | 2.8 | 5.2 | 1.2 |
| Comparative Example 1 | 36 | 3 | 0.16 | 0.60 | 5 | 2.1 | 7.3 | 0.8 |
| Comparative Example 2 | 32 | 4 | 0.11 | 0.30 | 4 | 2.4 | 6.9 | 0.9 |
| Comparative Example 3 | 28 | 2 | 0.10 | 0.30 | 3 | 2.0 | 6.4 | 0.7 |
| Comparative Example 4 | 26 | 4 | 0.13 | 0.30 | 4 | 3.1 | 6.6 | 1.1 |
| Comparative Example 5 | 14 | 5 | 0.15 | 0.05 | 1 | 4.0 | 5.0 | 2.5 |
| Comparative Example 6 | 15 | 3 | 0.13 | 0.05 | 2 | 2.1 | 3.9 | 1.0 |
| Comparative Example 7 | 17 | 2 | 0.09 | 0.10 | 2 | 1.6 | 6.7 | 1.3 |
| Comparative Example 8 | 33 | 2 | 0.17 | 0.30 | 4 | 5.0 | 7.1 | 0.9 |

(Note)
Low-temperature impact resistance: Determined for a film retorted at 120° C. for 30 min.

The invention claimed is:

1. A polypropylene film comprising 70-90 wt. % polymer (a), 2-10 wt. % polymer (b), 2-10 wt. % polymer (c) and 3-20 wt. % polymer (d), where the total weight of the polymers is 100 wt. %, and having a haze of 8-30%, where polymer (a): a propylene/ethylene block copolymer which is a block copolymer prepared by producing in a first step a polymer part (component a1) by polymerizing monomers composed mainly of propylene in the absence of an inert solvent and subsequently producing in a second step an ethylene/propylene copolymer part (component a2) through polymerization in a gas phase, wherein the content of component a2 is 15-25 wt. %, the combined amount of component a1 and component a2 is 100 wt. %, and a ratio of the intrinsic viscosity of component a2 ([η]a2) to the intrinsic viscosity of component a1 ([η]a1), [η]a2/[η]a1, is 0.8-1.5, and wherein polymer (a) at a temperature of 230° C. and a load of 21.18N has a melt flow rate (MFR, unit: g/10 min of 1.0 to 3.5;

polymer (b): an ethylene-based polymer having a density of 0.91-0.97 g/cm$^3$ and a melt flow rate of 5-30 g/10 min;

polymer (c): an ethylene/α-olefin random copolymer having a density of 0.86-0.90 g/cm$^3$ and a melt flow rate of 0.3-5 g/10 min;

polymer (d): a propylene-based polymer which comprises two or more propylene-based polymers different in molecular weight from each other, wherein the intrinsic viscosity ($[\eta]d1$) of a component having a highest molecular weight (component d1) is not less than 5 dl/g but less than 10 dl/g and is at least twice the intrinsic viscosity ($[\eta]d$) of the whole of polymer (d).

2. The polypropylene film according to claim 1, wherein polymer (d) has a melt flow rate at 230° C. of 10-20 g/10 min.

3. The polypropylene film according to claim 1, wherein the polypropylene film is a non-oriented film.

4. The polypropylene film according to claim 1, wherein the polypropylene film has a center line average roughness (Ra) of 0.08-0.16 μm.

5. A laminated material comprising the polypropylene film according to claim 1, laminated on one surface of a substrate layer comprising a transparent film composed of a single layer or two or more layers.

6. A laminated material comprising the polypropylene film according to claim 1, laminated on one surface of a substrate layer comprising an aluminum foil and a transparent film composed of a single layer or two or more layers.

7. A package comprising a substance to be packaged heat sealed in the laminated material according to claim 5.

8. The package according to claim 7, wherein the substance is retortable food.

* * * * *